(12) United States Patent
Hwang

(10) Patent No.: US 7,345,833 B2
(45) Date of Patent: Mar. 18, 2008

(54) DIRECTION-TURNING DEVICE FOR THE LENS OF A CAMERA PHONE

(76) Inventor: Jin-Chyuan Hwang, No. 6, Lane 31, Tai Zih 4th Road, Ren De, Tainan County (TW)

(*) Notice: Subject to any disclaimer, the term of this patent is extended or adjusted under 35 U.S.C. 154(b) by 0 days.

(21) Appl. No.: 11/389,135

(22) Filed: Mar. 27, 2006

(65) Prior Publication Data
US 2006/0261248 A1  Nov. 23, 2006

(30) Foreign Application Priority Data
May 17, 2005  (TW) ................. 94115872 A

(51) Int. Cl.
*G02B 2/02* (2006.01)
*H04M 1/10* (2006.01)
(52) U.S. Cl. ............... 359/819; 455/556.1; 455/575.1
(58) Field of Classification Search ............... 250/216, 250/234, 235, 236; 348/14.02, 335, 344, 348/552; 359/808, 819; 455/90.3, 556.1, 455/575.1
See application file for complete search history.

(56) References Cited

U.S. PATENT DOCUMENTS 6,697,117 B1 * 2/2004 Park ..................... 348/373
6,795,715 B1 * 9/2004 Kubo et al. ............. 455/556.1
6,904,298 B2 * 6/2005 Arai et al. ............... 455/556.1
6,922,212 B2 * 7/2005 Nakakubo et al. ......... 348/373
7,217,912 B2 * 5/2007 Hwang ................. 250/208.1

FOREIGN PATENT DOCUMENTS

FR    EP 1689181 A1 * 8/2006
JP    2005-275126 A1 * 6/2005

* cited by examiner

*Primary Examiner*—David N. Spector
(74) *Attorney, Agent, or Firm*—Bacon & Thomas, PLLC

(57) ABSTRACT

A direction-turning device for the lens of a camera phone is contained in a chamber extending between the front and rear sides of the camera phone, the chamber having front and rear openings each covered with a transparent window. The direction turning device includes a lens base fitted in the chamber having a lens in a sidewall of the lens base for shooting pictures, and a driving unit able to activate the lens base to rotate to let the lens to face toward the front side or the rear side of the phone through the transparent windows. Therefore, the invention is totally hidden in the chamber and able to optionally shift the lens to face toward the front side of the phone for self-shooting or the rear side of the phone for shooting normally.

12 Claims, 13 Drawing Sheets

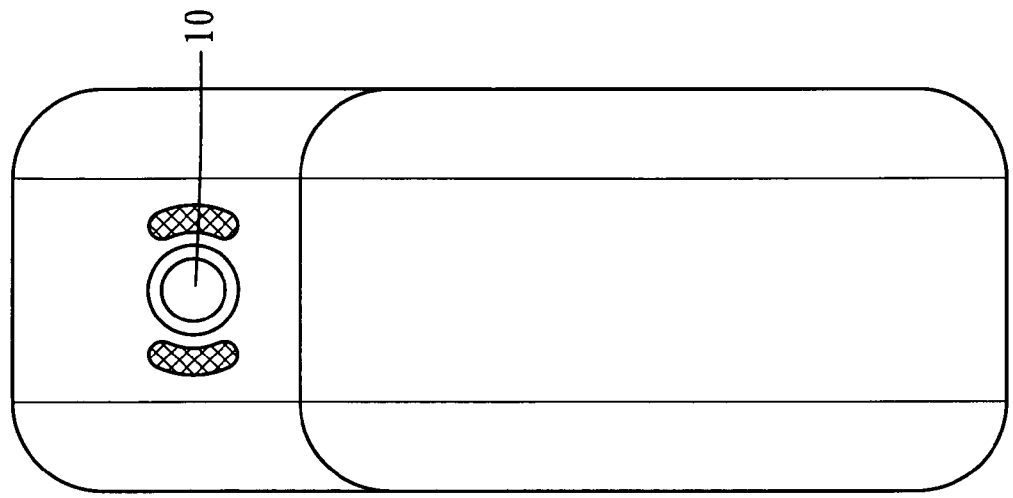
FIG. 1 *(PRIOR ART)*
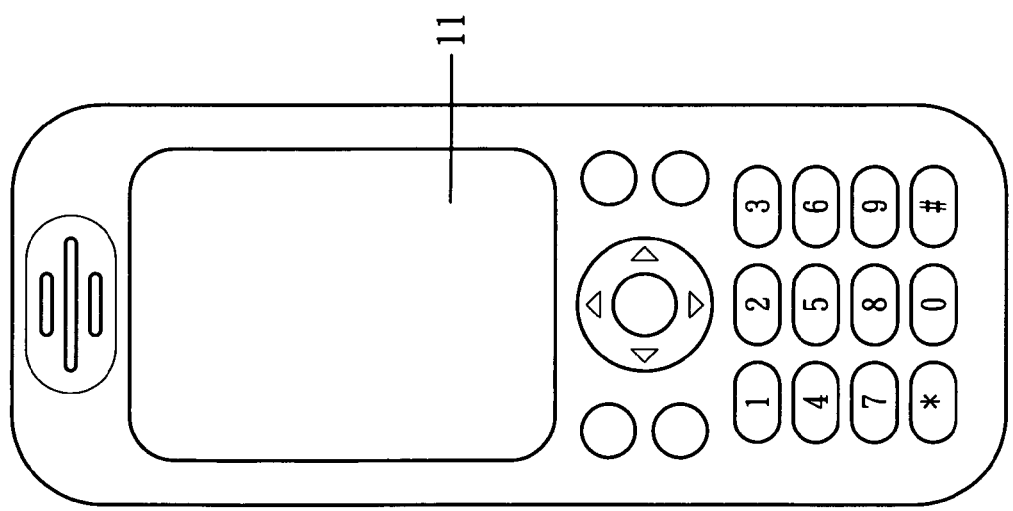
FIG. 2 *(PRIOR ART)*

DIRECTION-TURNING DEVICE FOR THE LENS OF A CAMERA PHONE

BACKGROUND OF THE INVENTION

1. Field of the Invention

This invention relates to a direction-turning device for the lens of a camera phone, particularly to one that is able to hide the lens in the camera phone and rotate the lens to face through the front side of the phone for self-shooting or through the rear side of the phone for shooting normally.

2. Description of the Prior Art

As shown in FIGS. 1 and 2, a first non-foldable conventional camera phone is provided with a lens 10 fixed immovably in the back, so that the lens is aimed forward while a user holds the camera phone and views images seen through the lens on a screen 11 in the front of the phone, convenient for a user to take a picture. But, if a user wants to take a self-shooting picture, he has to stand in front of a mirror and keep the lens aimed at the portrait in the mirror for shooting, which is really inconvenient for self-shooting.

Next, as shown in FIGS. 3 and 4, a second non-foldable camera phone is provided with a gap 12 in the top for fitting with a lens base 13, which is provided with a shaft 130 at its two ends respectively for connecting pivotally with an interior wall of the gap 12 so that the lens base 13 can be turned around to enable the lens 10 to face forwards for normal shooting or backwards for self-shooting. But, the gap 12 formed in the front top of the phone tremendously downgrades the aesthetic appearance of the phone.

The present invention has been devised to overcome the defects mentioned above.

SUMMARY OF THE INVENTION

The objective of this invention is to offer a direction-turning device for the lens of a camera phone.

The main characteristics of the invention, contained in a chamber extending between a front and a rear side of the camera phone, the chamber having openings at the front and rear sides of the camera phone each covered with a transparent opening, includes a lens base fitted in the chamber and having a lens in a sidewall of the lens base for shooting pictures, and a driving unit able to activate the lens base to rotate for 180 degrees to let the lens to face toward the front side or the rear side of the phone through the transparent windows. Therefore, the invention is totally hidden in the chamber and is able to optionally shift the lens to face toward the front side of the phone for self-shooting or the rear side of the phone for shooting normally.

BRIEF DESCRIPTION OF DRAWINGS

This invention is better understood by referring to the accompanying drawings, wherein:

FIG. 1 is a front view of a first conventional non-foldable camera phone;

FIG. 2 is a rear view of the first conventional non-foldable camera phone;

DETAILED DESCRIPTION OF THE PREFERRED EMBODIMENT

Figure 3:
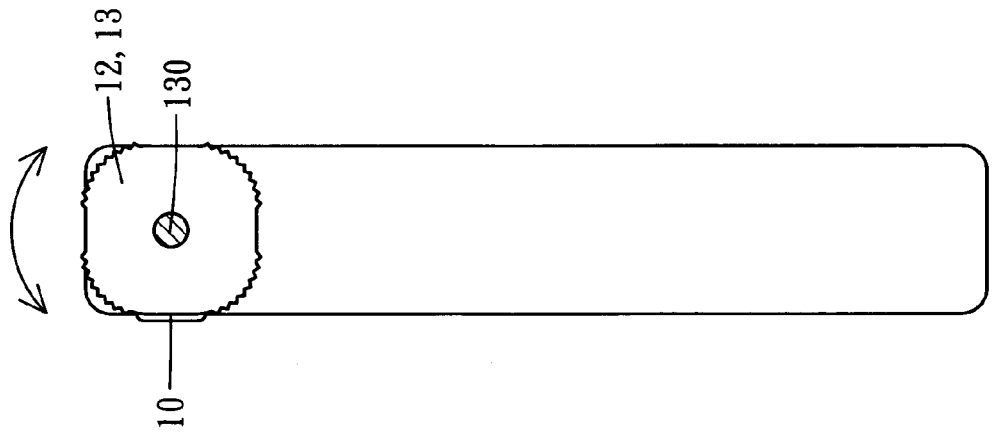
FIG. 3 is a front view of a second conventional non-foldable camera phone.
Figure 4:
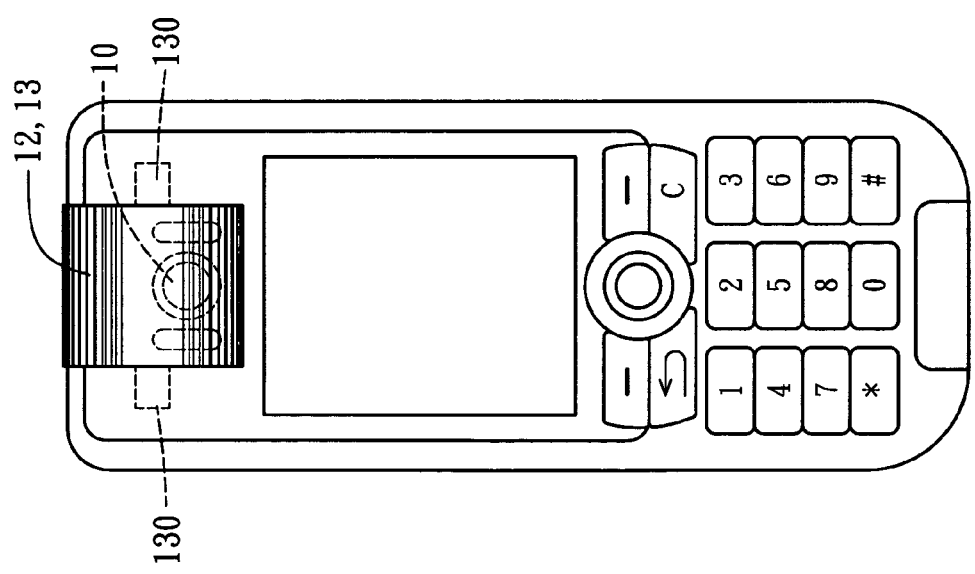
FIG. 4 is a rear view of the second conventional non-foldable camera phone.
Figure 5:
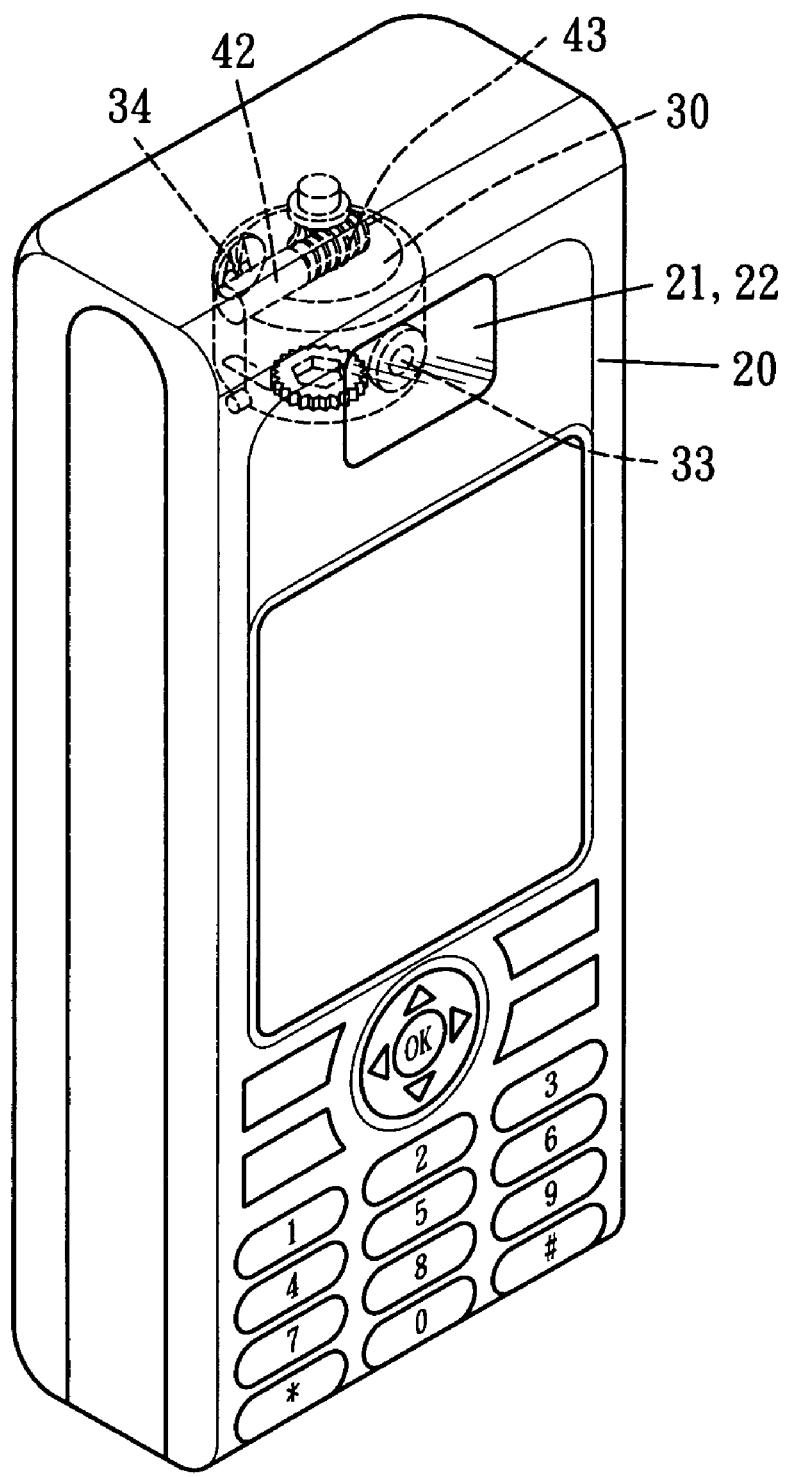
FIG. 5 is a perspective view of a first preferred embodiment of a direction-turning device for the lens of a camera phone in the present invention.
Figure 6:
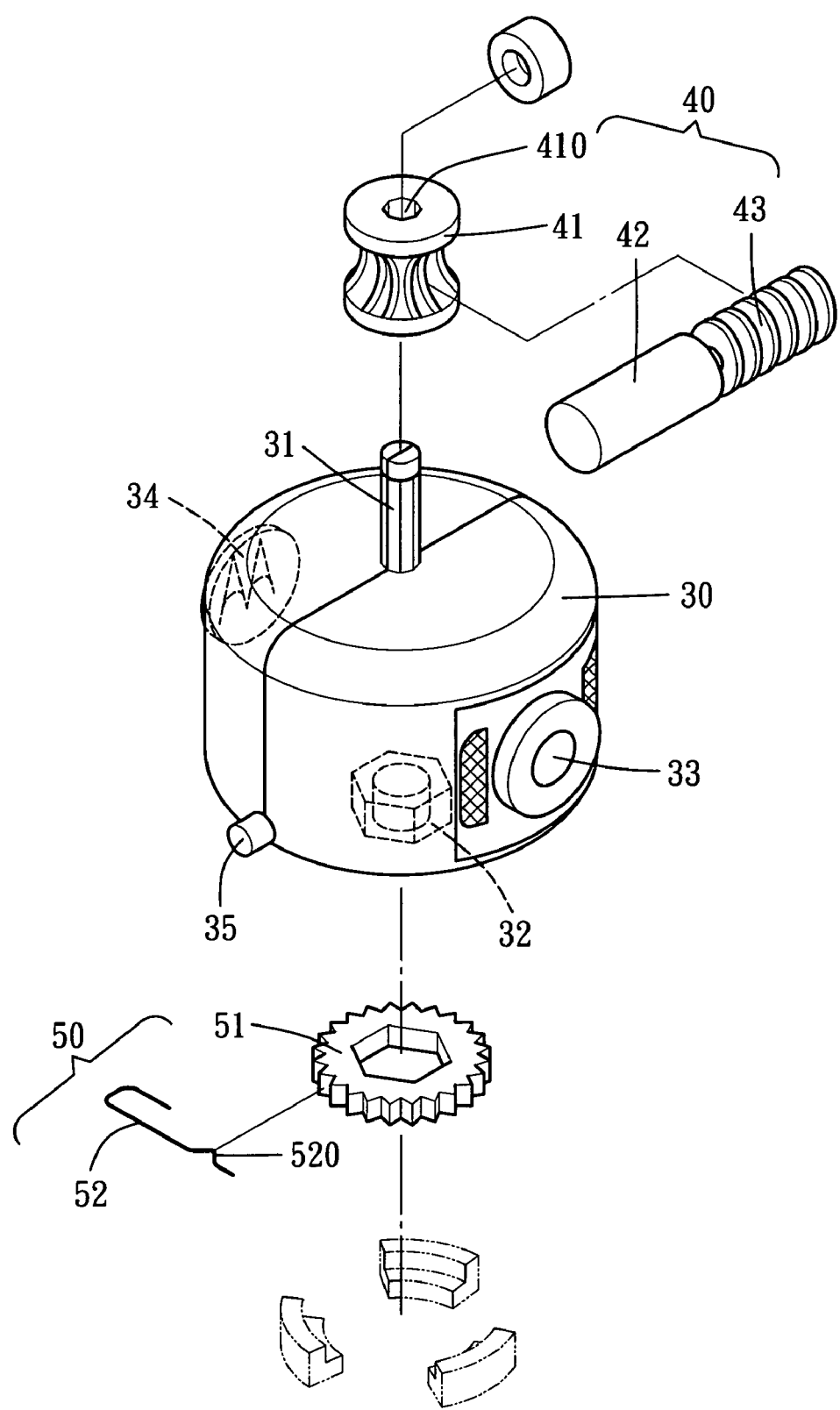
FIG. 6 is a partial exploded perspective view of the first preferred embodiment of a direction-turning device for the lens of a camera phone in the present invention.
Figure 7:
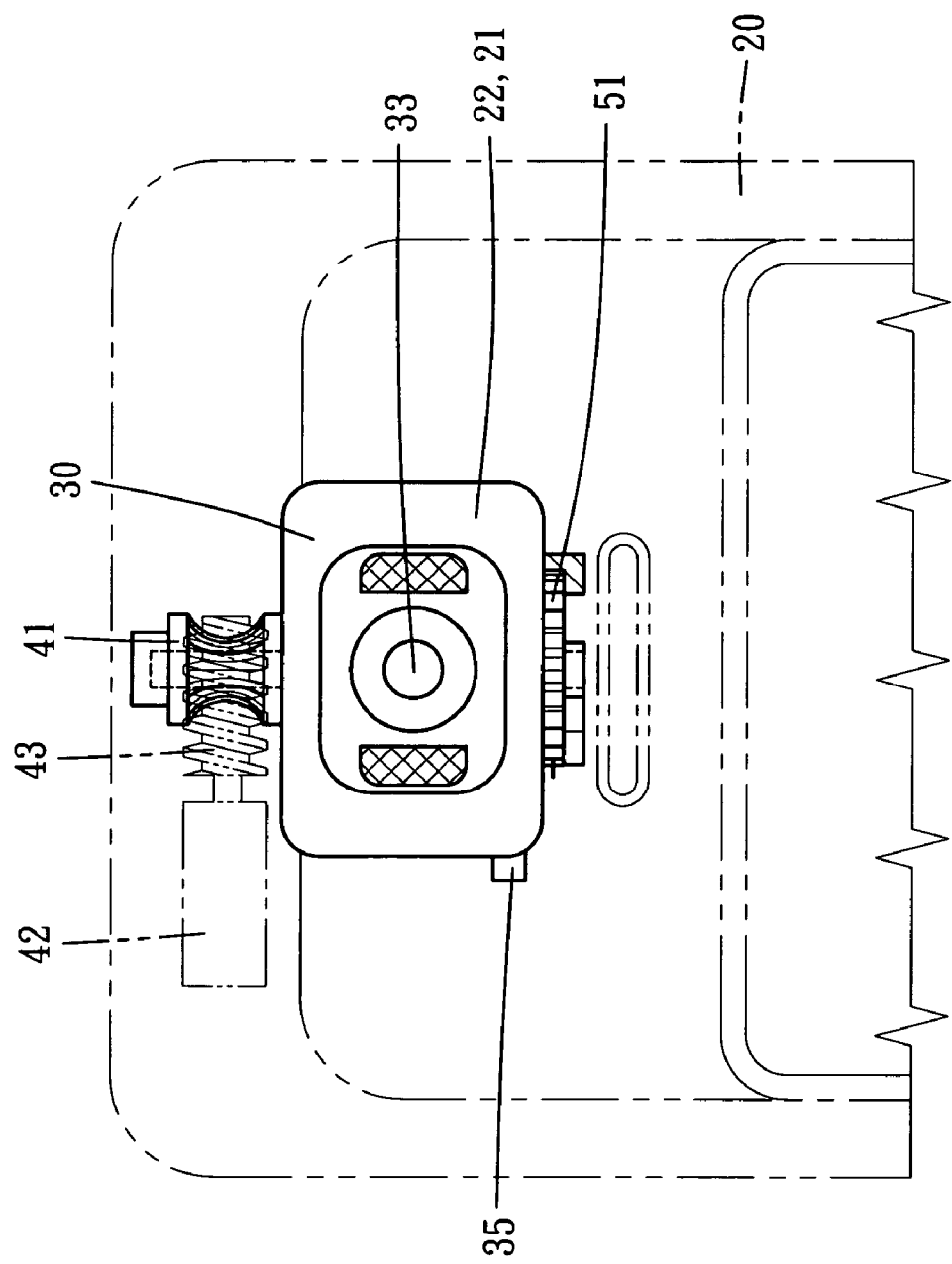
FIG. 7 is a partial front view of the first preferred embodiment of a direction-turning device for the lens of a camera phone in the present invention.

As shown in FIGS. 5, 6 and 7, a first preferred embodiment of a direction-diverting device for the lens of a camera phone 20 in the present invention includes a lens base 30, a driving unit 40, and a positioning unit 50. The camera phone 20 is provided with a chamber 21 extending between the front and rear sides of the camera phone, at an upper portion of the camera phone. Chamber 21 has openings at the front and rear sides of the camera phone that are each covered with a transparent window.

The lens base 30, as shown in FIG. 6, is provided with an upper pivot 31 extending up from the upper side, a lower pivotal bar 32 extending up from the lower side, a lens 33 fixed in the sidewall, and a trademark graphic 34 located in the sidewall opposite to the lens 33. The graphic 34 is lit up when the phone gets a call. The upper and lower pivot 31 and 32 are supported pivotally within the chamber 21 so that the lens base 30 is pivotally installed in the chamber 21. The lowermost end of the upper pivot 31 and the lower pivot 32 has a polygonal shape, and the upper end of the upper pivot 31 is round.

The driving unit 40, as shown in FIG. 6, may be controlled to operate by a button on the phone, activating the lens base 30 to turn back and forth for 180 degrees. The driving unit is provided with a worm gear 41 having a center hole 410 with the same shape as the upper pivot 31, for engaging with the upper pivot 31 so that the worm gear 41 is linked and rotates together with the lens base 30. A motor 42 is provided to drive a worm 43 that engages with the worm gear 41, to rotate the lens base 30.

Figure 9:
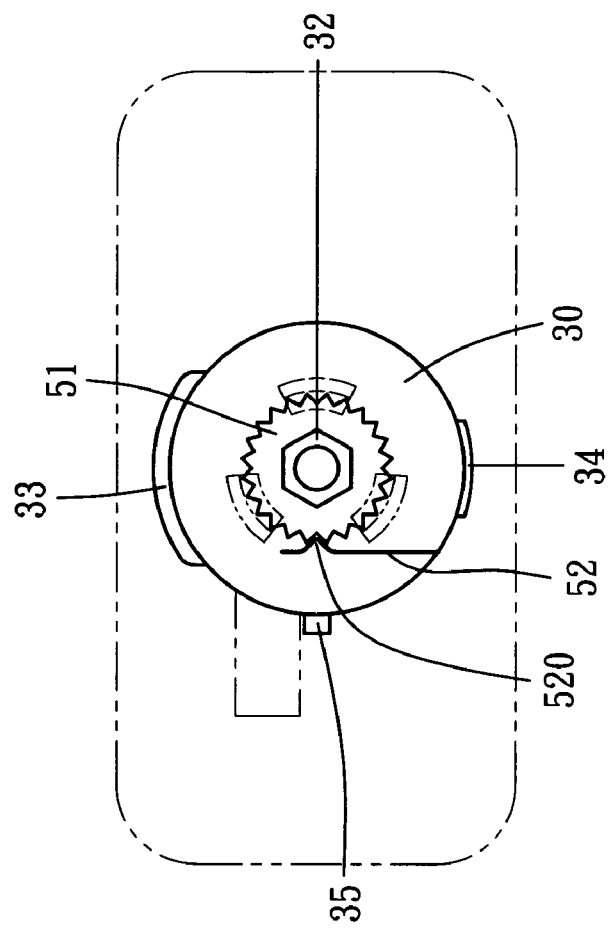
FIG. 9 is a partial bottom view of the first preferred embodiment of a direction-turning device for the lens of a camera phone in the present invention.
Figure 8:
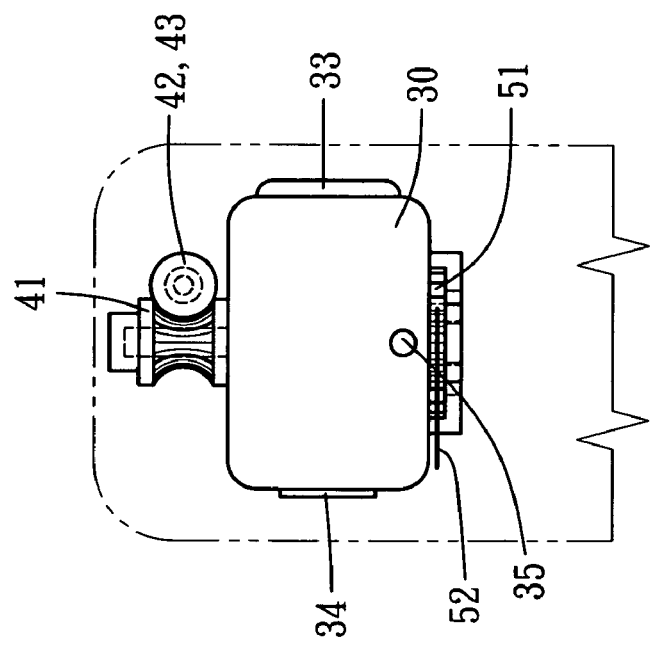
FIG. 8 is a partial side view of the first preferred embodiment of a direction-turning device for the lens of a camera phone in the present invention.

The positioning unit 50, as shown in FIG. 6, is provided with an auxiliary gear 51 fixed tightly with the lower pivot 32 of the lens base 30, and an elastic locking wire 52 having a conical hump 520 protruded to engage in a gap between two teeth of the auxiliary gear 51, as shown in FIG. 9. Whenever the auxiliary gear 51 and the lens base 30 are stopped from rotating, the lens base 30 can be immediately held securely and stably in position by means of the conical hump 520 stopping the auxiliary gear 51. In addition, a blocker 35 projecting from a predetermined position on a lower portion of the sidewall of the lens base 30 can stop the lens base 30 after a rotation of 180 degrees. Of course, the blocker 35 can be replaced with an electronic sensing device, which is composed of two sensors set in the sidewall of the lens base 30 and the camera phone 20 respectively and able to sense each other when they approach to face each other, the electronic sensing device being operative to stop the driving unit 40 from operating.

Figure 10:
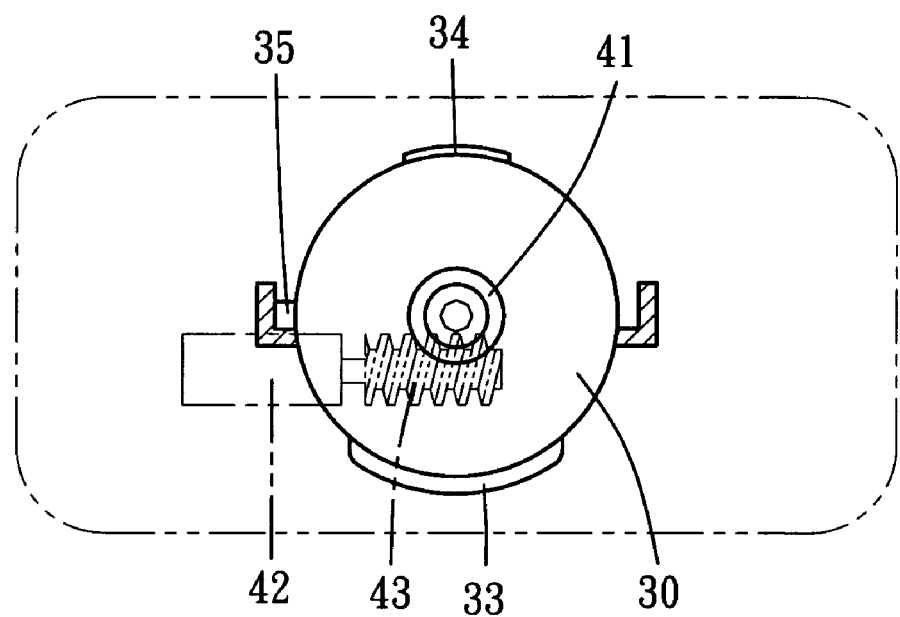
FIG. 10 is an upper view of the first preferred embodiment of a direction-turning device for the lens of a camera phone in the present invention, showing its lens shifted to face toward the front side of the phone.
Figure 11:
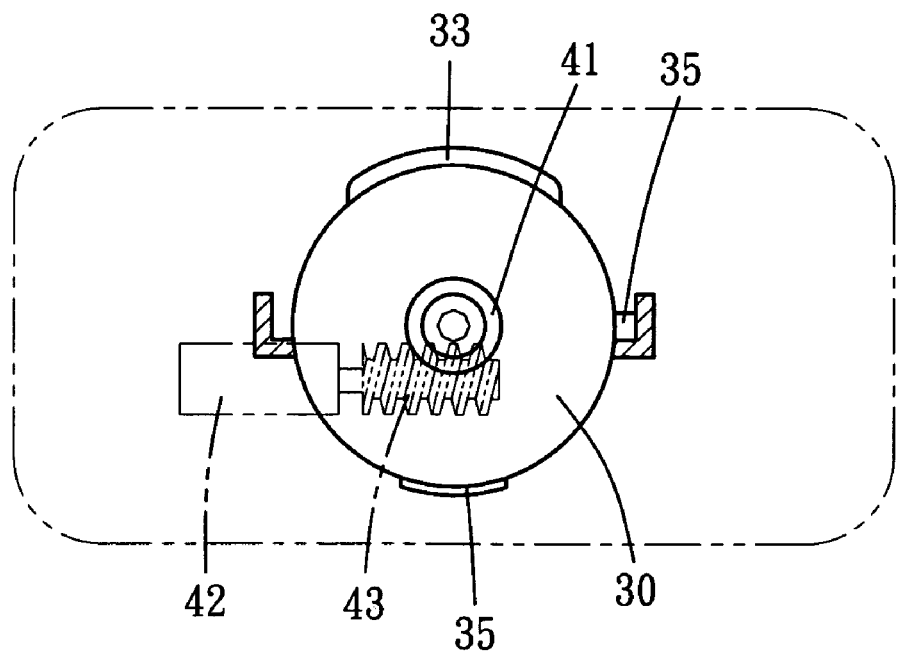
FIG. 11 is an upper view of the first preferred embodiment of a direction-turning device for the lens of a camera phone in the present invention, showing its lens shifted to face toward the rear side of the phone.
Figure 12:
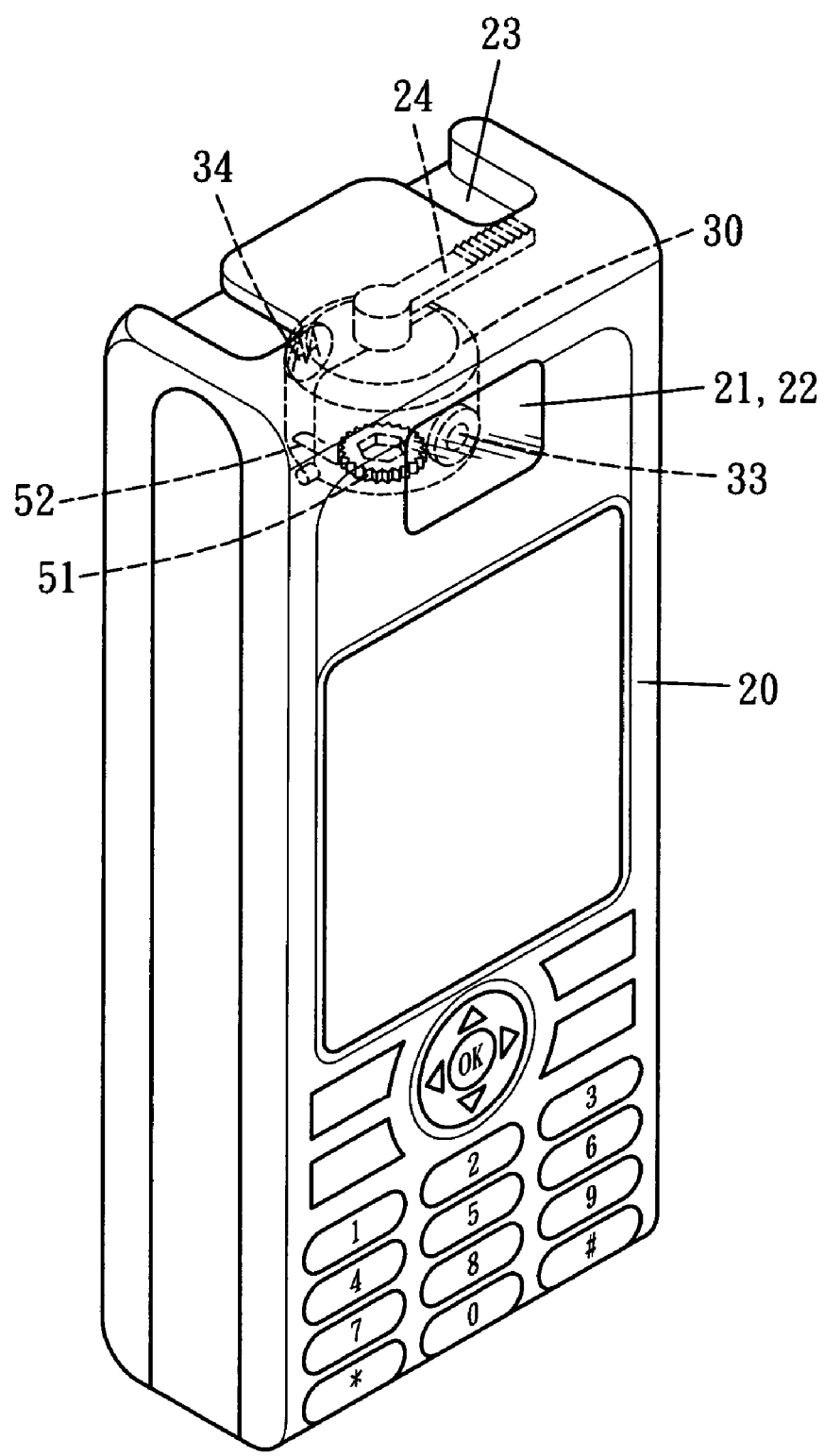
FIG. 12 is a perspective view of a second preferred embodiment of a direction-turning device for the lens of a camera phone in the present invention.
Figure 13:
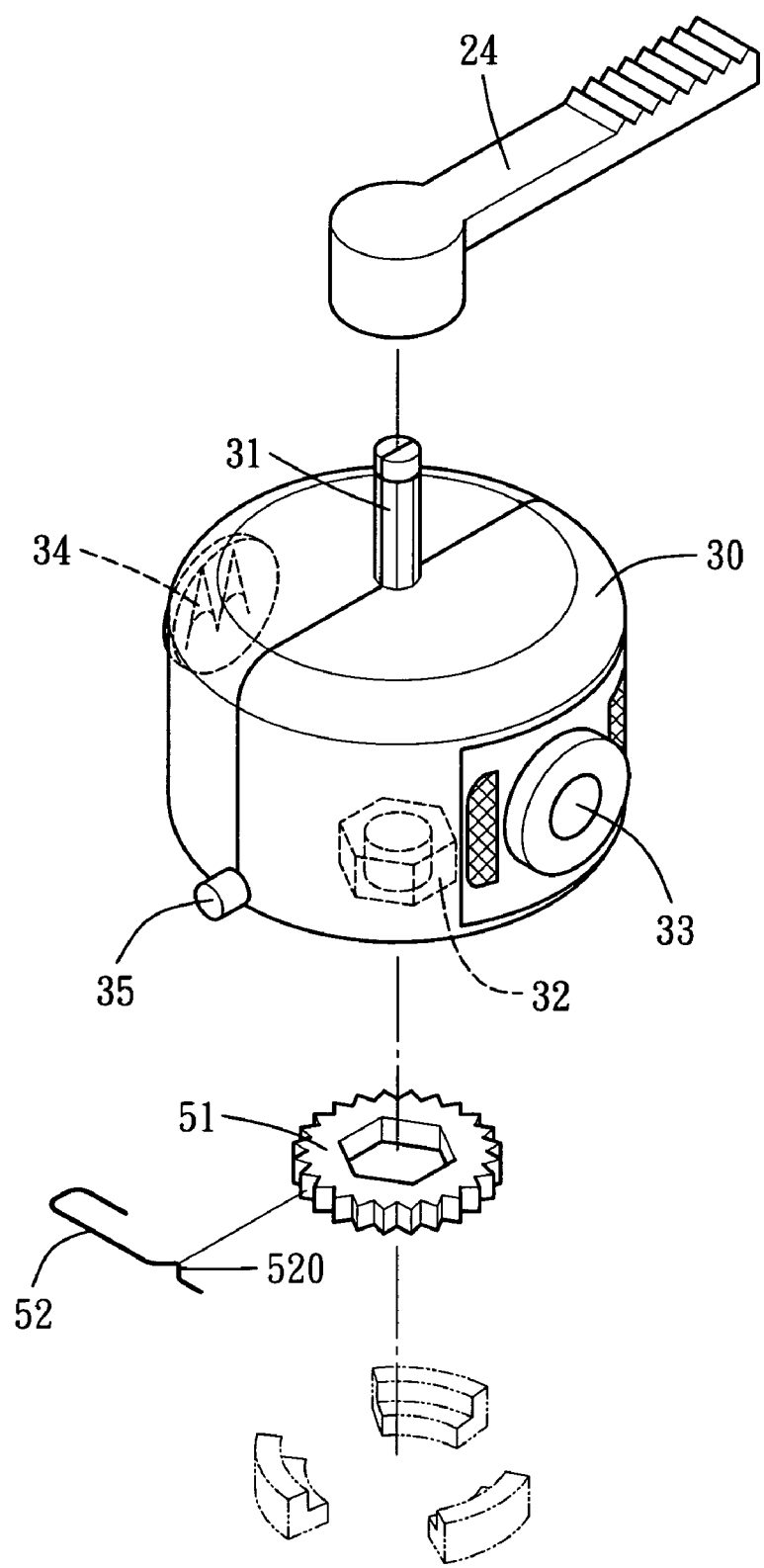
FIG. 13 is a partial exploded perspective view of the second preferred embodiment of a direction-turning device for the lens of a camera phone in the present invention.

In use, as shown in FIGS. 5-7, pressing the controlling button activates the motor 42 so as to drive the worm 43 and the worm gear 41 to rotate successively. Then, the auxiliary gear 51 and the lens base 30 are of course activated to move, enabling the lens 33 of the lens base 30 to face toward the front side of the phone for shooting oneself, as shown in FIG. 10, or the rear side of the phone for shooting normally, as shown in FIG. 11. And, since the auxiliary gear 51 can be locked by the conical hump 520 of the elastic locking wire 52, the lens base 30 is immediately positioned securely and stably whenever it is rotated to a desired position and stopped, as shown in FIG. 9. Moreover, when the lens 33 is facing toward the front side of the phone 20, the graphic 34 is facing toward the rear side of the phone 20, and vice-versa. Therefore, the lens 30 between the transparent windows 22 does not give a monotonous impression.

Figure 14:
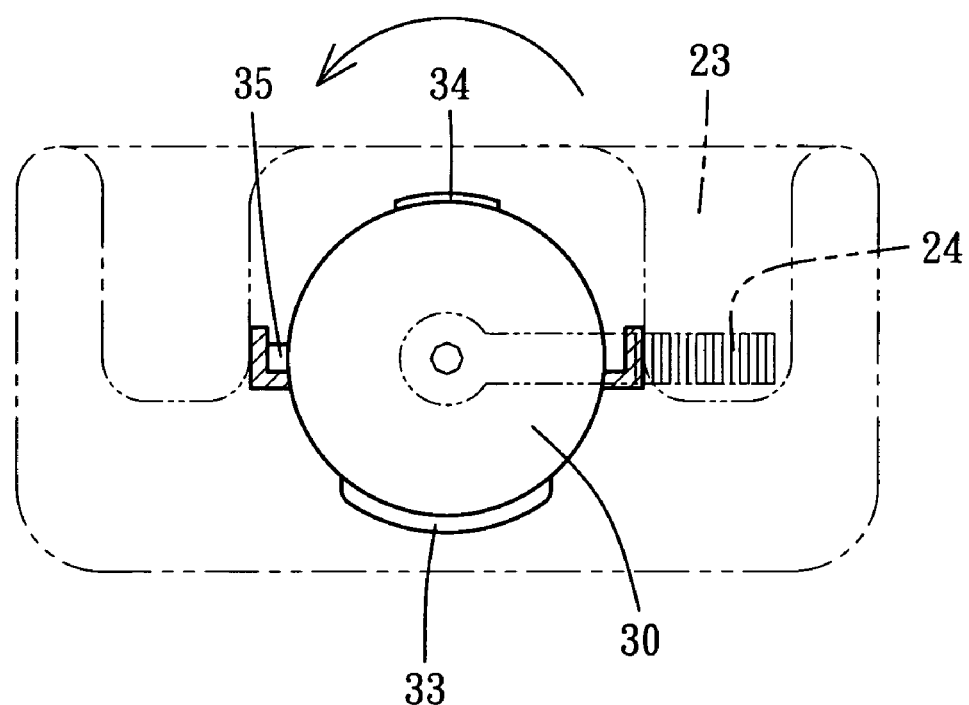
FIG. 14 is an upper view of the second preferred embodiment of a direction-turning device for the lens of a camera phone in the present invention, showing its lens shifted to face toward the front side of the phone.
Figure 15:
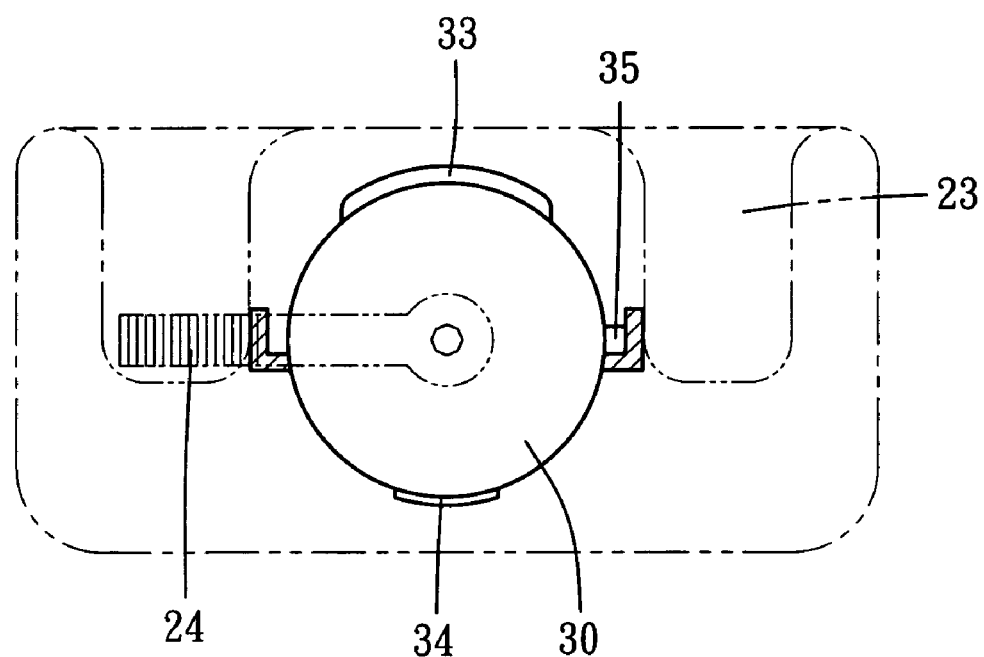
FIG. 15 is an upper view of the second preferred embodiment of a direction-turning device for the lens of a camera phone in the present invention, showing its lens shifted to face toward the rear side of the phone.
Figure 16:
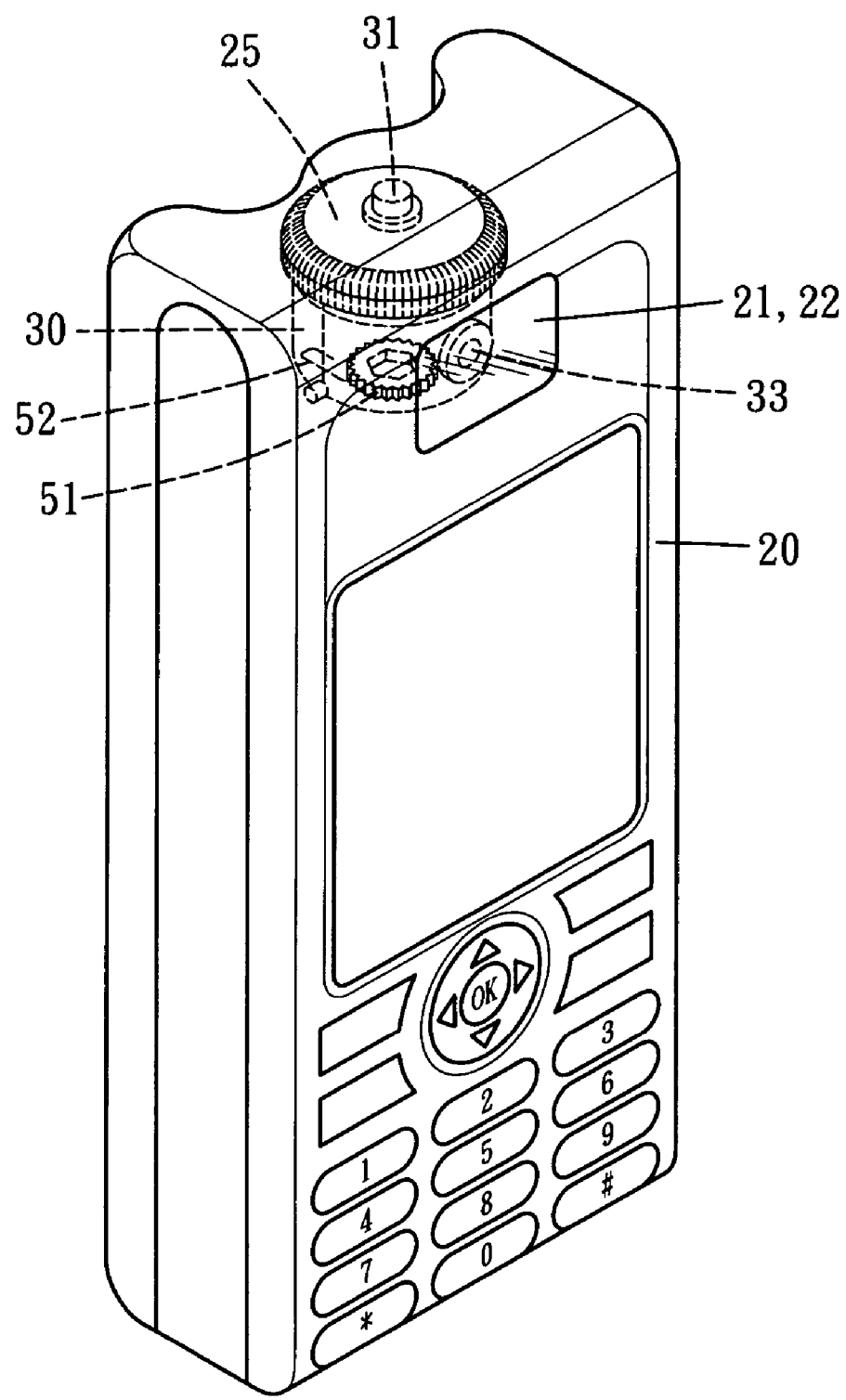
FIG. 16 is an exploded perspective view of a third preferred embodiment of a direction-turning device for the lens of a camera phone in the present invention.
Figure 17:
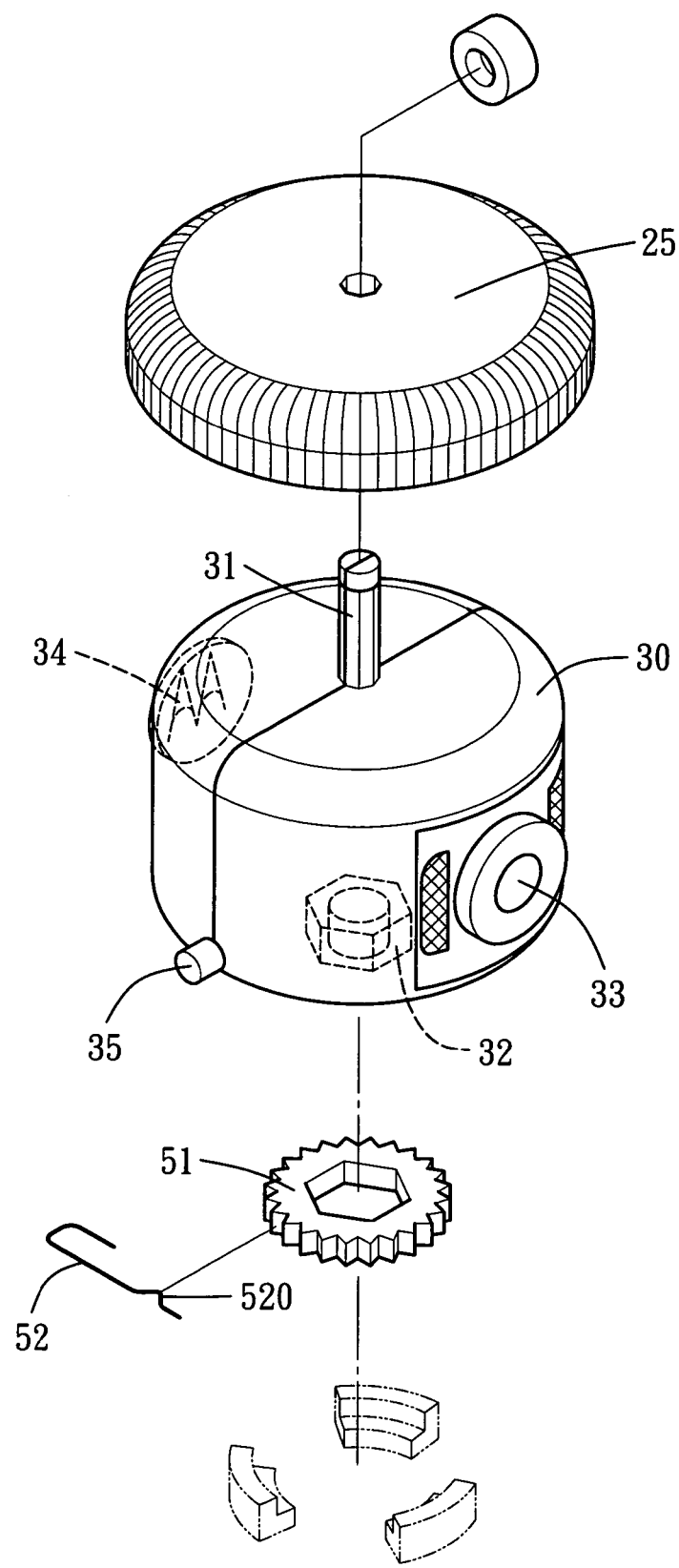
FIG. 17 is a partial exploded perspective view of the third preferred embodiment of a direction-turning device for the lens of a camera phone in the present invention.

Next, as shown in FIGS. 12-15, a second preferred embodiment of a direction-turning device for the lens of a camera phone in the present invention has mostly the same components as the first embodiment does, except that the driving unit 40 is replaced with a manual device, which is provided with a lever 24 having one end fixed to the top end of the upper pivot 31 and another end movable between two grooves 23 in the top of the phone 20 at two sides of the upper pivot 31 of the lens base 30. When the lever 24 is moved to swing for 180 degrees, the lens base 30 and the lens 33 are moved by the lever 24 for the same angle, turning the lens 33 to face toward the front side of the phone 20, as shown in FIG. 14, or the rear side of the phone 20, as shown in FIG. 15.

Figure 18:
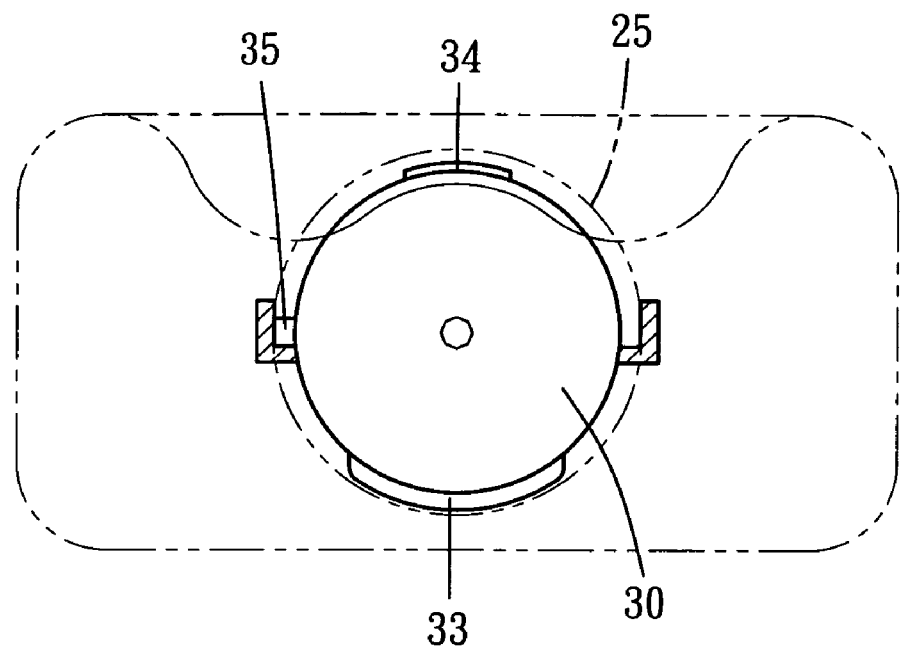
FIG. 18 is an upper view of the third preferred embodiment of a direction-turning device for the lens of a camera phone in the present invention, showing its lens shifted to face toward the front side of the phone.
Figure 19:
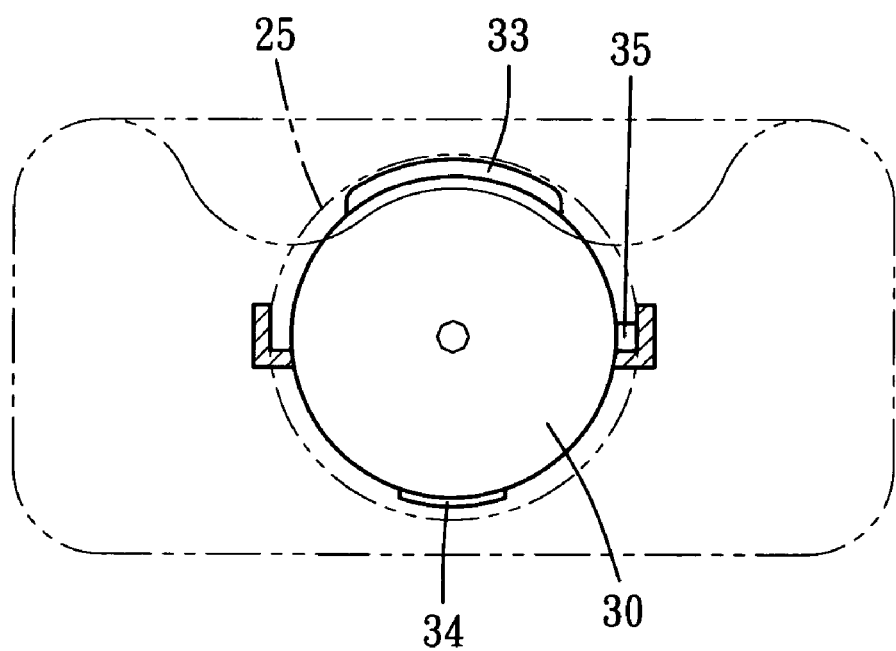
FIG. 19 is an upper view of the third preferred embodiment of a direction-turning device for the lens of a camera phone in the present invention, showing its lens shifted to face toward the rear side of the phone.

As shown in FIGS. 16-19, the lever 24 in the second preferred embodiment can also be replaced with a toothed rotator 25 partly exposed outside the phone 20 for a finger to move it, enabling the lens 33 of the lens base 30 to be rotated to face toward the front side of the phone 20, as shown in FIG. 18, or the rear side of the phone 20, as shown in FIG. 19.

While the preferred embodiment of the invention has been described above, it will be recognized and understood that various modifications may be made therein and the appended claims are intended to cover all such modifications that may fall within the spirit and scope of the invention.

What is claimed is:

1. A direction-turning device for a lens of a camera phone, the camera phone being provided with a chamber extending through the camera phone from a front side of the camera phone to a rear side of the camera phone, the chamber having a front and a rear side opening, each being covered with a transparent window, said device comprising:
    a lens base pivotally disposed in said chamber, the lens base being provided with a lens installed in a sidewall of the lens base, an upper pivot extending from an upper side of the lens base, a lower pivot extending from a lower side;
    a driving unit configured to rotate said lens base between a position wherein said lens faces toward said window at the front side of said camera phone and a position wherein said lens faces the rear side of said camera phone; and
    a positioning unit configured to securely and stably hold said lens base in position while said lens base is stopped from rotating;
    wherein said driving unit is provided with a worm gear fixed with said lower pivot of said lens base, a motor controlled by a button on said phone, and a worm driven by said motor and engaging with said worm gear, wherein activation of said motor causes said motor to drive said worm to rotate said worm gear, thereby rotating said lens base.

2. A direction-turning device for a lens of a camera phone, the camera phone being provided with a chamber extending through the camera phone from a front side of the camera phone to a rear side of the camera phone, the chamber having a front and a rear side opening, each being covered with a transparent window, said device comprising:
    a lens base pivotally disposed in said chamber, the lens base being provided with a lens installed in a sidewall of the lens base, an upper pivot extending from an upper side of the lens base, a lower pivot extending from a lower side;
    a driving unit configured to rotate said lens base between a position wherein said lens faces toward said window at the front side of said camera phone and a position wherein said lens faces the rear side of said camera phone; and
    a positioning unit configured to securely and stably hold said lens base in position while said lens base is stopped from rotating;
    wherein said driven member is provided with a lever having an end fixed to said upper pivot, wherein said lever is configured to manually activate said lens base to rotate by moving said lever.

3. A direction-turning device for a lens of a camera phone, the camera phone being provided with a chamber extending through the camera phone from a front side of the camera phone to a rear side of the camera phone, the chamber having a front and a rear side opening, each being covered with a transparent window, said device comprising:
    a lens base pivotally disposed in said chamber, the lens base being provided with a lens installed in a sidewall of the lens base, an upper pivot extending from an upper side of the lens base, a lower pivot extending from a lower side;

a driving unit configured to rotate said lens base between a position wherein said lens faces toward said window at the front side of said camera phone and a position wherein said lens faces the rear side of said camera phone; and a positioning unit configured to securely and stably hold said lens base in position while said lens base is stopped from rotating;

wherein said driven unit is provided with a toothed rotator fixed to said upper pivot and partly exposed outside said phone, wherein said toothed rotator is configured to manually drive said lens base to rotate by rotating said toothed rotator.

4. A direction-turning device for the lens of a camera phone as claimed in claim 1, wherein said positioning unit is provided with an auxiliary gear fixed to said lower pivot and an elastic locking wire set beside said auxiliary gear, the locking wire having a conical hump protruded to engage in a gap between two teeth of said auxiliary gear to securely and stably hold said lens base in position after it is stopped from rotating.

5. A direction-turning device for the lens of a camera phone as claimed in claim 1, wherein said lens base is provided with a blocker projecting from the sidewall of said lens base to prevent said lens base from moving past a predetermined position.

6. A direction-turning device for the lens of a camera phone as claimed in claim 1, wherein two sensors are installed in the sidewall of said lens base and said phone respectively, and wherein said sensors are configured to command said driving unit to cease working while said sensors approach and face each other.

7. A direction-turning device for the lens of a camera phone as claimed in claim 2, wherein said positioning unit is provided with an auxiliary gear fixed to said lower pivot and an elastic locking wire set beside said auxiliary gear, the locking wire having a conical hump protruded to engage in a gap between two teeth of said auxiliary gear to securely and stably hold said lens base in position after it is stopped from rotating.

8. A direction-turning device for the lens of a camera phone as claimed in claim 2, wherein said lens base is provided with a blocker projecting from the sidewall of said lens base to prevent said lens base from moving past a predetermined position.

9. A direction-turning device for the lens of a camera phone as claimed in claim 2, wherein two sensors are installed in the sidewall of said lens base and said phone respectively, and wherein said sensors are configured to command said driving unit to cease working while said sensors approach and face each other.

10. A direction-turning device for the lens of a camera phone as claimed in claim 3, wherein said positioning unit is provided with an auxiliary gear fixed to said lower pivot and an elastic locking wire set beside said auxiliary gear, the locking wire having a conical hump protruded to engage in a gap between two teeth of said auxiliary gear to securely and stably hold said lens base in position after it is stopped from rotating.

11. A direction-turning device for the lens of a camera phone as claimed in claim 3, wherein said lens base is provided with a blocker projecting from the sidewall of said lens base to prevent said lens base from moving past a predetermined position.

12. A direction-turning device for the lens of a camera phone as claimed in claim 3, wherein two sensors are installed in the sidewall of said lens base and said phone respectively, and wherein said sensors are configured to command said driving unit to cease working while said sensors approach and face each other.

* * * * *